United States Patent [19]

Fournier

[11] Patent Number: 4,635,448
[45] Date of Patent: Jan. 13, 1987

[54] TRAINING AID FOR DETECTOR/COOLER ASSEMBLY

[75] Inventor: William R. Fournier, Woodbridge, Va.

[73] Assignee: The United States of America as represented by the Secretary of the Army, Washington, D.C.

[21] Appl. No.: 807,403

[22] Filed: Dec. 10, 1985

[51] Int. Cl.[4] .............................................. F25B 19/00
[52] U.S. Cl. .................................. 62/467; 62/514 R; 250/352
[58] Field of Search .............. 62/467, 514 R; 250/352

[56] References Cited

U.S. PATENT DOCUMENTS 3,889,119  6/1975  Whicker et al. .................... 250/352
4,150,552  4/1979  Altman .............................. 62/467 R
4,199,953  4/1980  Richter et al. ..................... 62/467 R
4,245,479  1/1981  Richter et al. ..................... 62/467 R
4,253,022  2/1981  Allen et al. ....................... 250/352 X
4,270,603  6/1981  Reisman et al. ................... 62/467 R
4,324,104  4/1982  Horn et al. ....................... 250/352 X
4,501,131  2/1985  Gaskin et al. .................... 250/352 X Primary Examiner—Lloyd L. King
Attorney, Agent, or Firm—Max L. Harwell; John E. Holford; Anthony T. Lane

[57] ABSTRACT

A training device is provided to test the skill of a worker assembling coolers with cold fingers to dewars containing infrared detectors. The latter are very expensive and fragile. Dummy units are employed and undesirable contacts between these units are recorded electrically.

5 Claims, 5 Drawing Figures

TRAINING AID FOR DETECTOR/COOLER ASSEMBLY

The invention described herein may be manufactured, used, and licensed by the U.S. Government for governmental purposes without the payment of any royalties thereon.

BACKGROUND OF THE INVENTION

1. Field of the Invention

This invention is related to infrared detectors, particularly detectors which operate at the temperature of liquid nitrogen or less.

2. Description of the Prior Art

The efficiency of many early infrared detection systems was greatly enhanced by placing the detector or array of detectors in a bath of liquid nitrogen. This technique worked well in laboratory situations, but supplying liquid nitrogen to detectors in field environments has proven to be prohibitive in terms of cost, manpower, transportation and storage. Such detectors have now been largely replaced by mechanical cryogenic coolers using low molecular weight gases such as helium.

The detector dewar presently used employ fragile elements in relationship which made assembly and disassembly a hazardous procedure. The low temperature portion of the cooler is in the shape of a finger having a uniform cross-section and a flat end surface to match the back surface of the detector array: e.g. the flat back surface of a semiconductor chip. The detector is mounted in an evacuated ceramic (e.g. glass) or metal and ceramic dewar to insulate the former from the ambient atmosphere. To accomodate the cold finger a reentrant portion of the dewar wall is shaped to match the cold finger. The reentrant portion is only slightly larger in cross-section than the cold finger so that there will be a minimum of convective gas trapped therein after the cold finger is fully inserted and sealed by means of a rubber gasket near the cross-section where the dewar begins to diverge from the finger. The flat end surface of the finger is presented by a highly conductive and preferably an extremely easily deformable end structure of the finger such as described in U.S. Pat. No. 4,190,106 entitled "Optimized Cooler Dewar", granted Feb. 6, 1980 to Howard L. Dunmire and Stuart B. Horn. The finger's flat end portion itself thus does not overstress the complimentary end portion of the reentrant portion of the dewar. However, as the finger is inserted the rigid portions of the finger can come into contact with the reentrant wall with sufficient pressure to cause cracking and loss of vacuum in the latter. Since the dewars are actually complex structures with sealed wiring and gold plated contacts they are very expensive and the above problems is not a trivial one.

BRIEF DESCRIPTION OF THE INVENTION

The present invention provides a dummy training cooler and dewar which can be substituted for a working cooler and dewar as described above, during the recruiting and training of production line assemblers, depot assemblers on maintenance personnel. The dummy model is fitted with electrical sensors which indicate stressing of fragile parts during assembly as a measure of the trainee's skill.

BRIEF DESCRIPTION OF THE DRAWINGS

The invention is best understood with reference to the drawings, wherein.

DESCRIPTION OF THE PREFERRED EMBODIMENT

Figure 1:
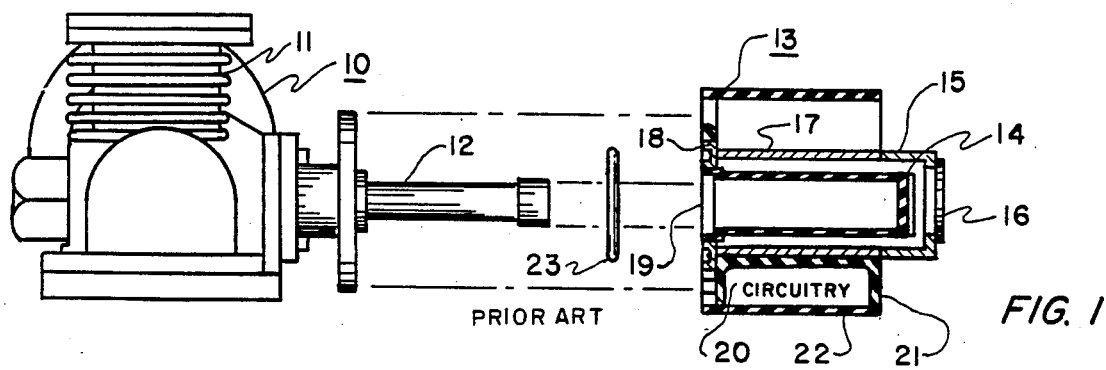
FIG. 1 shows a disassembled cooler and detector-dewar aligned prior to assembly by a trained technician.

The general structure of a prior art cooler unit and detector-dewar unit is shown in FIG. 1. The left hand structure 10 is a mechanical cooler which employs a Stirling cycle or a Villumier cycle compressor and a low molecular weight coolant gas such as helium to achieve temperatures from 10° to 77° K. The heat extracted from the gas by compression is dissipated to the atmosphere by fins 11 which surround the compression chamber of the cooler. After cooling, the compressed gas expands into the cold finger 12, which as its name implies exhibits a very steep temperature gradiant. The temperature is coldest at the right hand tip and increases as slowly as insulating techniques permit to the left hand tip of the finger, which is the closest approach to the hot compressor environment.

The detector-dewar structure 13 is shaped to provide a female unit which interfaces with the male cooling unit 10. The prime purpose of the interface is to place the coldest point on the cold finger 12 in the nearest possible thermal coupling relationship to an IR detector array 14 mounted in a vacuum cavity of unit 13. The vacuum cavity is defined by an apertured metal cap 15, an IR transmissive window 16 (e.g. as disk of germanium), a tublar frame member 17, a sealing flange 18 and a tubular glass member 19. The female mating surface is formed by the tubular glass member 19 which consists of a cylindrical side wall closed at one end by a disc shaped end wall. The glass end wall supports the detector and separates it from the cold tip of the finger 12.

Unfortunately, the tip of the cold finger cannot contact the glass directly. One reason for this is difference in thermal expansion of metal and glass which would crack the glass. Equally important is the fact that, in spite of design improvements which balance the moving masses in the compressor, sufficient vibration is transmitted through the cold finger to cause disruptive microphonics in the detector. In practice, a safe minimal spacing is established and special extremely compliant bellows or fibrous metal pads may be used to thermally bridge the gap. The rubber o-ring 23 also helps to insulate the dewar from any undesirable vibration and temperature effects in the cold finger.

A considerable amount of circuitry is placed in the annular space 20 surrounding frame member or metal tube 17. The space is defined by a plastic spool member 21 and a plastic tube cover 22. Numerous conductors not shown pass through the spool member and the metal tube to connect the circuitry to the detector array 14 and to external contacts, also not shown. Such circuitry has no bearing on the present invention, except that it may conveniently be removed from a broken dewar to make space 20 available.

Figure 2:
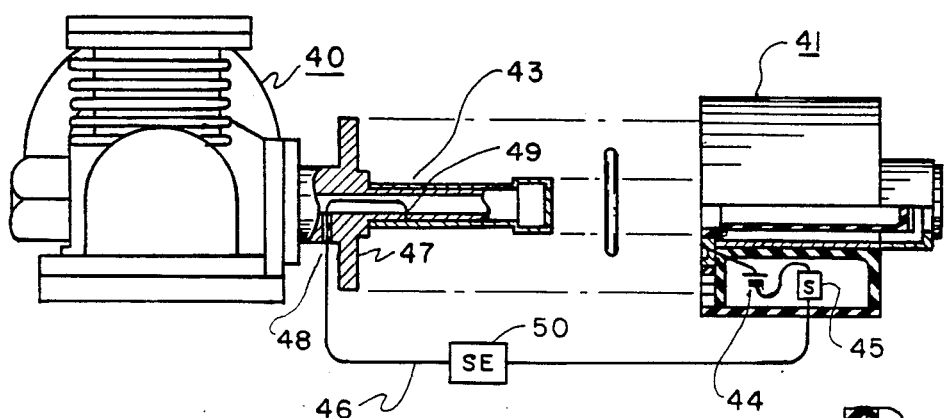
FIG. 2 shows a dummy cooler according to the present invention aligned prior to assembly by a trainee.
Figure 2A:
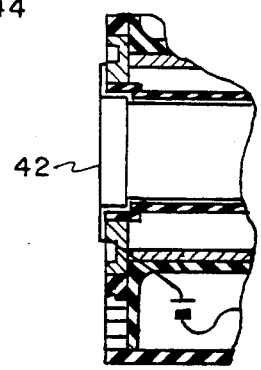
FIG. 2A shows an enlarged portion of the dewar 41 in section detailing conductive material applied to its glass inner surface.

A dummy cooling unit and detector-dewar, similar to the above, is used in the training system of the invention. As shown in FIG. 2 the training device may be, for example, a worn out cooler 40 and a defective detector-dewar 41. The latter is modified as shown in FIG. 2A by plating the exposed inner glass surface with an electrically conductive material 42 such as metal or conductive epoxy. Obviously, the glass portion must be substantially intact, although it may no longer be vacuum tight. If the cold finger has an electrically conductive metal outside surface no modification is required, however, when it is not, a metal plating or other conductive coating 43 must be applied.

An electrical alarm circuit is connected between coating 42 and coating 43 or the surface of the cold finger. The circuit includes, as a minimum, a source of electrical power such as the battery 44 and a signalling device 45. The devices can be placed in the annular space 20 after removing the normal circuitry. If the entire cold finger is initially plastic, it may be advantageous to run one lead 46 behind flange 47 (as shown) to leave the front surface free to mate with the dewar. The lead runs through aperture 48 and aperture 49 to bond with the plating 43. When the cold finger is all metal this lead can be attached to a spot on the outer most edge of the flange or any other point on the cold finger closer to the compressor. With a plastic (dummy) cold finger this can also be true, if the plating 43 is extended to the spot where the lead is attached. The opposite end of the circuit is attached to the plating 42 by drilling an opening through the plastic spool 21 and any intervening nonconductive members. The lead may be attached to conductive coating 42, the flange 18 or the conductive tube 17 both of which are in electrical contact with plating 42. In a simulated model all parts but the platings 42 and 43 can be plastic, but metal weights may be employed to restore the balance and "feel" of the original units.

The signalling device 45 as shown would be a buzzer or the like. As the trainee inserts the cold finger into the dewar, he hears a buzz each time there is contact between these surfaces and as long as such contact is maintained. The compressible and portion of the cold finger is omitted so that a perfect insertion will not set off the buzzer at all. An external signalling device 50 can be used with or instead of the device 45. This might be a light, for example and would be more suitable for a deaf trainee.

Figure 3:
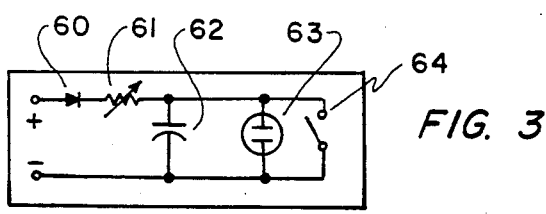
FIG. 3 shows a signalling device for the dummy cooler of FIG. 2.

FIG. 3 shows a quantitative signalling device that can replace either the device 45 or 50 in FIG. 2. As contact is made between the cold finger and the dewar a changing current flows through diode 60 and limiting resistor 61 to raise the voltage or capacitor 62. When the voltage reaches the threshold of a gas tube 63, the gas tube (e.g. neon) flashes to provide a visible signal and discharges the capacitor to a low voltage. Resistor 61 which is adjustable determines the length of time it takes the capacitor to charge.

When the gas tube threshold voltage is 63% of the battery or source voltage a 100,000 ohm resistor will charge a 100 microfarad capacitor to this threshold in about ten seconds, this represents more than enough contact time to rupture the dewar during assembly or disassembly. The trainee can reduce the value of the value of the resistor, if he suceeds in assembling the two cooler units without the gas tube flashing. Before each assembly the switch 64 is closed for a second to completely discharge the capacitor. The trainee would have to achieve a selected number of assemblies at a selected minimum value of resistor 61 to qualify for the assembly line. Alternatively a qualified assembler can use the device to test assembly methods, e.g. the use of jigs on other types of positioning means.

Figure 4:
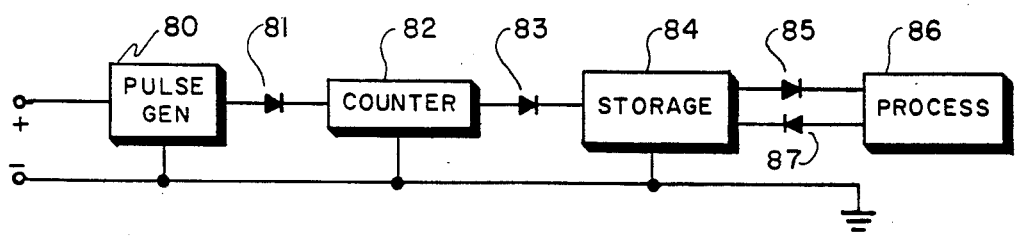
FIG. 4 shows a more sophisticated signalling device for the dummy cooler of FIG. 2.

A more sophisticated type of signalling device is shown in FIG. 4. The presence of the source potential at the input terminals triggers pulse generator 80. Conventionally such generators can operate in either of two modes. They can generate a single pulse each time the input voltage cycles on-and-off or they can generate a periodic series of uniform timing pulses, the number of pulses generated being a measure of the time the input is applied. Both modes give useful data for the present applications, but the latter is preferred.

The timing pulses pass through directing diode 81 to a counter 82, e.g. an integrated circuit having a storage register which counts consecutive pulses and transfers the count as a binary number through one or more directing diodes, such as diode 83, to a storage device or multiregister memory 84 when a pulse fails to appear in the generating timing sequence. The stored counts or numbers can then pass through diodes like diode 85 to be processed by a central processing unit 86. The results can then be passed through diodes like diode 87 to the same storage unit 84 (or another) to begin a further processing cycle. Additional parallel inputs can obviously be added, each having a separate pulse generator and counter for a different trainee to supply additional data in storage device 84. The processor can then weight and compare data as desired on a group of trainees.

I claim:

1. A training apparatus for assemblers of low temperature IR detection systems, comprising:
    a male test unit having the same external configuration as an existing IR detector cooler with a cold finger, at least the portion of said unit representing said cold finger having a fist electrically conductive surface;
    a female test unit having the same external configuration as an existing detector dewar for said cooler, the recess in said dewar for said cold finger having a second electrically conductive surface;
    said first and second conductive surfaces including all areas of surfaces of said male and female units which are separated by less than one centimeter when the units are assembled, except for those areas which are in contact;
    an electronic signalling device; and
    an electric power source, said source and device each being electrically connected to a different one of said first and second surfaces and serially connected to each other, whereby contact between said surfaces activates a warning signal.

2. The apparatus of claim 1, wherein:
    said male test unit has the same mass distribution as said existing cooler.

3. The apparatus of claim 1 wherein:
    said female test unit has the same mass distribution as said existing detector-dewar element.

4. The method of training personnel to assemble infrared detectors having cold fingers that are inserted into a dewar comprising the steps of:

applying a conductive coating to all nonconductive surfaces of said cold finger and dewar that are separated by less than one centimeter when said cold finger and dewar is in an assembled state;
applying a coating of nonconductive material to all conductive surfaces of said cold finger and dewar which are in contact in said state;
connecting an electric signalling device and power source serially between at least two of said conducting coatings which are separated in said state; and
assembling said cold finger and dewar while monitoring the current flow between said resultant surfaces with said signalling device.

5. The apparatus according to claim 1, further including:
  an electronic computer means coupled between said first and second surfaces to analyze and record contact between said surfaces.

* * * * *